3,531,419
CATALYST COMPRISING DIALKYL ALUMINUM
DIFLUORIDE AND TiCl₄ OLEFINS
Edwin A. Schmall, Springfield, and Stanley B. Mirviss,
Westfield, N.J., assignors to Esso Research and Engineering Company, a corporation of Delaware
No Drawing. Filed May 24, 1961, Ser. No. 113,053
Int. Cl. B01j 11/78
U.S. Cl. 252—429                                   6 Claims This invention is concerned with a catalyst composition that contains a dialkyl aluminum difluoramine mixed with a liquid solution of a transition metal halide, such as a solution of titanium tetrahalide in a solvent or diluent which is inert to the catalyst.

More particularly, this invention provides a new heterogeneous catalyst composition which is a mixture of dispersed solid dialkyl aluminum difluoramine, such as diethyl aluminum difluoramine having the formula $$Al(C_2H_5)_2(NF_2)$$

dispersed in a solution of TiCl₄ in a hydrocarbon diluent, such as the liquid hydrocarbons: pentane, heptane, decane or white oils, hydroaromatics, aromatics, such as xylene, benzene and the like. The catalyst is useful for improving the polymerization of olefins in a slurry catalyst system.

The olefins ethylene and propylene, or $C_2$ to $C_3$ alkenes, can be polymerized by the novel catalyst composition containing the NF₂-substituted aluminum alkyl compound mixed with a solution of a transition metal halide such as TiCl₄. The preferred mole ratio of Al to Ti is 0.1/1 to 6/1, reaction temperature of 20° to 100° C., and catalyst concentration of 0.01 to 10 g. of total catalyst per liter of diluent. The polymerizing activity of this catalyst is surprisingly high compared to that of catalysts which contain as active ingredients aluminum trialkyl or dialkyl aluminum chloride with a transition metal halide such as TiCl₄ or the ilke under comparable conditions.

The dialkyl aluminum difluoramines and their preparation are a recent invention disclosed and claimed in application Ser. No. 64,959, filed Oct. 25, 1960, now U.S. Pat. No. 3,346,347, by Edwin A. Schmall. The process for making the dialkyl aluminum difluoramines involves reacting trialkyl aluminum with N₂F₄ under a pressure of about 700 to 760 mm. Hg absolute at temperatures of about 25° C. to 100° C. For safety the reaction is carried out slowly by diffusing N₂F₄ gas into contact with the trialkyl aluminum through an inert gas, e.g. N₂ or He, which acts as a gaseous diluent.

As an example, triethyl aluminum contained in pentane is reacted slowly with N₂F₄ which is diffused through N₂ gas into contact with the triethyl aluminum under a pressure of 760 mm. Hg abs. At a temperature of 25° C. in the reaction zone, the reaction period was terminated in about 8 days. By increasing the amount of N₂F₄ supplied per gram of triethyl aluminum from 250 cc. to 900 cc. and raising the reaction temperature to 100° C. the time of reaction is lowered to about 48 hours. The triethyl aluminum becomes converted to a glassy product which is washed by and filtered from pentane. After drying the glassy product under vacuum it becomes a fine powder identified as Al(C₂H₅)₂(NF₂), diethyl aluminum difluoramine.

The NF₂-substituted aluminum alkyl compound is recovered as solid. It differs from simple halogen substituted and other mono and even disubstituted aluminum alkyls in being insoluble in suitable liquid hydrocarbon diluents for the catalyst system.

A more detailed example of the preparation of diethyl aluminum difluoramine is given as follows:

The reactor was charged with 2 grams of concentrated triethyl aluminum in an inert atmosphere of helium and stirred by a magnetic stirrer. The reactor was at about atmospheric pressure and maintained at a temperature of 25° C. The reactant vessel was first evacuated and then charged with 500 cc. of N₂F₄ at a pressure of about 700 mm. Hg which was 20 to 60 mm. less than the pressure in the reactor. The valve in the line connecting the two vessels was opened and some helium from the reactor flowed into the reactant vessel containing the N₂F₄ gas. This procedure precluded any violent reaction between the N₂F₄ and the triethyl aluminum in the reactor. After the pressure between the two vessels became equalized, the N₂F₄ slowly diffused into the reactor containing the triethyl aluminum. The triethyl aluminum was slowly converted from a colorless liquid to a viscous "'glass." The pressure within the system generally increases during the reaction period. The reaction was terminated after 8 days by replacing the oxidizing agent with nitrogen. The glassy aluminum diethyl difluoramine product was mixed with pentane for several hours. The pentane was removed and the product collected on a filter and dried first by suction, then by high vacuum. On drying, the product was converted to a finely-dispersed powder. The product (1.2 grams) was identified as aluminum diethyl difluoramine.

Utility of the novel catalyst composition is exemplified as follows:

EXAMPLE

A bomb was charged with 0.2 g. of Al(C₂H₅)₂(NF₂), 0.5 ml. of a 1 M TiCl₄ solution (3/1, Al/Ti mole ratio), and 30 ml. of dried n-heptane. It was pressured to 500 p.s.i.g. with ethylene and then heated at 100° C. for 3 hours. The maximum pressure was 720 p.s.i.g. and at the end of 3 hours it was 585 p.s.i.g. 1.44 g. of solid polymer (5 g. of polymer/g. of total catalyst) was obtained upon filtration of the polymerization product. The polymer had a melting point of 125° C., a specific gravity of 0.9528 and a molecular weight of 1,600,000 (inherent viscosity of 9.99).

What is outstanding about the polymerization shown in the foregoing example is the high molecular weight of the polymer product compared to the molecular weight of only about 500,000 for a polymer product formed with a catalyst that contains diethyl aluminum chloride and titanium tetrachloride.

The dialkyl aluminum difluoramine can contain various $C_1$ to $C_4$ alkyl radicals, e.g. methyl, ethyl, propyl, butyl, or the like to fit the requirements of this invention for making a heterogeneous catalyst system with a solution of a transition metal halide.

Metal halides to be selected in general contain a transition metal of Groups IV–B, V–B, VI–B and VIII of the Periodic System, e.g., titanium, zirconium and chromium.

The liquid diluent used as a solvent for the transition metal halide and dispersant for the dialkyl aluminum difluoramine may contain about 0.01 to 1 wt. percent of these catalyst components which are present in varying ratios as indicated.

When the polymerization is completed, the catalyst is deactivated and washed away from the polymer by addition of an alcohol, e.g. methanol.

The catalyst system of the present invention is used in polymerizing olefins under reaction conditions well known in the art for catalysts of the titanium tetrachloride-aluminum triethyl or TiCl₄-diethyl aluminum chloride type. The preferred polymerizing temperatures are in the range of about 0 to 150° C. The preferred pressures are in the range of about 1 to 100 atmospheres.

The catalyst concentrations are of the same order. The procedures of reaction and methods of recovering the polymer freed of catalyst are similar to those used with the catalysts containing trialkyl aluminum or dialkyl aluminum halide in a solution of a transition metal halide such as $TiCl_4$. Thus, no critical limitations on conditions or proportions are indicated.

There is no exact explanation at present about the mechanism of the catalyst in its action of promoting the polymerization of the olefins. There are indications that a reaction of the dialkyl aluminum difluoramine with the transition metal halide occurs in which halogen from the metal halide is exchanged for an alkyl group of the alkyl aluminum compound.

The invention is not limited to specific figures on conditions or proportions since these may be varied as taught and as will appear to one skilled in this art.

What is claimed is:

1. The method of preparing an olefin polymerizing catalyst which comprises mixing $(C_2H_5)_2Al(NF_2)$ with a liquid paraffin hydrocarbon solution of $TiCl_4$ in a proportion to have the resulting mixture contain 0.1 to 6 moles of Al per mole proportion of Ti.

2. A catalyst composition mixture of dialkyl aluminum difluoramine and titanium tetrachloride in a proportion of 0.1 to 6 moles of Al per mole of Ti, the alkyl radical in the dialkyl aluminum difluoramine containing 1 to 4 carbon atoms.

3. A catalyst composition consisting essentially of diethyl aluminum difluoramine dispersed as a solid in an inert diluent containing dissolved $TiCl_4$ in a proportion of 1 mole per 0.1 to 6 moles of the diethyl aluminum difluoramine.

4. A catalyst composition comprising a dispersion of finely-divided dialkyl aluminum difluoramine dispersed in an inert liquid hydrocarbon diluent containing dissolved $TiCl_4$, the alkyl radical of the dialkyl aluminum difluoramine containing 1 to 4 carbon atoms, the aluminum of the dispersed dialkyl aluminum difluoramine being in a ratio of 0.1 to 6 moles per mole of the dissolved titanium tetrachloride.

5. In the polymerization of $C_2$ to $C_3$ alkene to polymers, the improvement of catalyzing polymerization of the alkene in an inert liquid diluent containing dispersed dialkyl aluminum difluoramine having 1 to 4 carbon atoms in the alkyl radical and containing dissolved titanium tetrachloride in a proportion of 0.1 to 6 moles of Al per mole of Ti.

6. In the polymerization of ethylene to a high molecular weight polymer, the improvement of catalyzing polymerization in a liquid paraffin hydrocarbon solution of titanium tetrachloride containing 0.1 to 6 moles of diethyl aluminum difluoramine dispersed therein per mole of titanium tetrachloride dissolved therein.

References Cited

FOREIGN PATENTS 824,460   12/1959   Great Britain.

LELAND A. SEBASTIAN, Primary Examiner

U.S. Cl. X.R.

260—93.7, 94.9, 95, 448